No. 755,337. PATENTED MAR. 22, 1904.
C. H. WALTERS.
COTTON CHOPPER.
APPLICATION FILED OCT. 14, 1903.
NO MODEL. 3 SHEETS—SHEET 1.
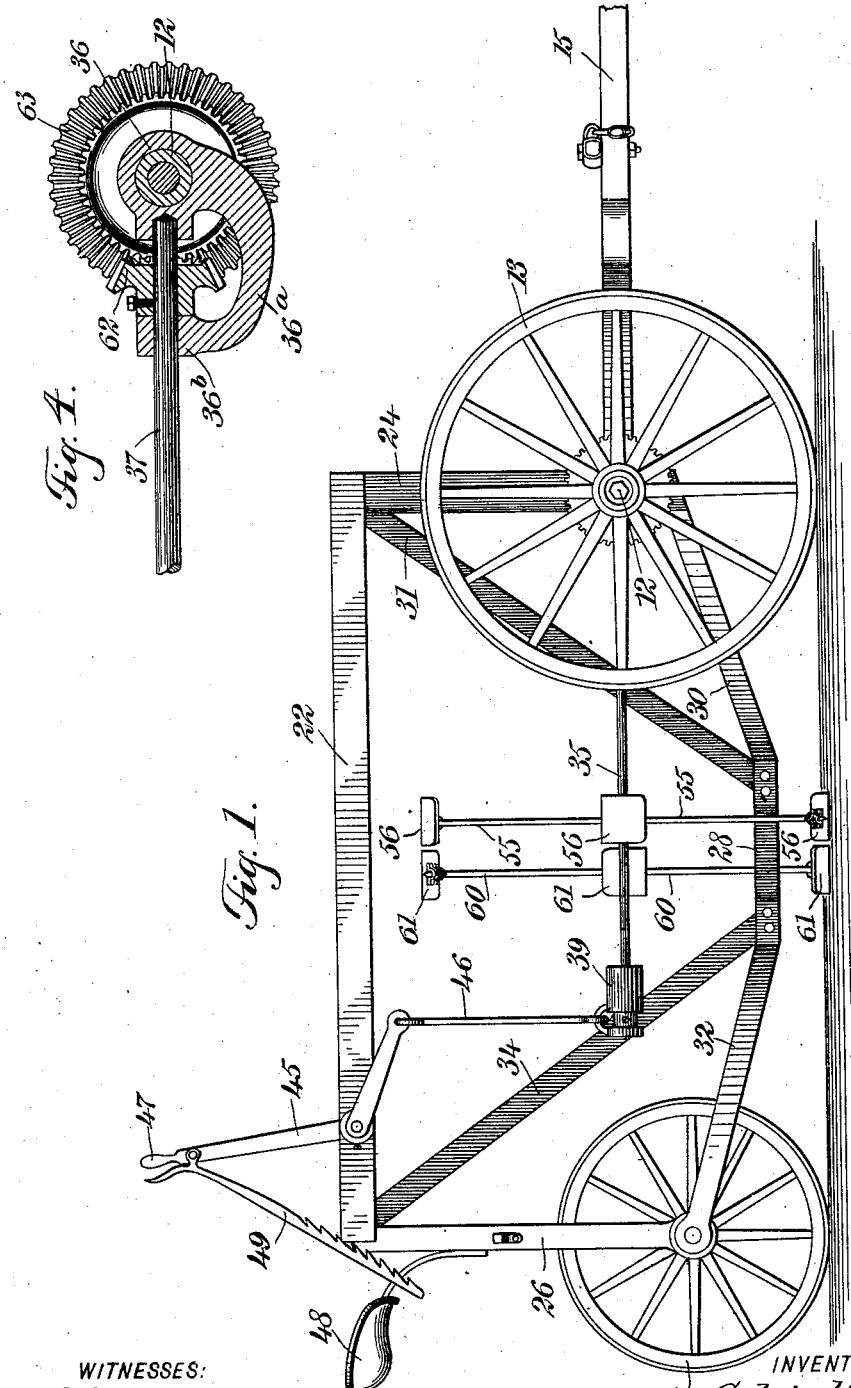
WITNESSES:
A. B. Mattingly
W. H. Reid.
INVENTOR
Calvin H. Walters
BY
ATTORNEYS No. 755,337. PATENTED MAR. 22, 1904.
C. H. WALTERS.
COTTON CHOPPER.
APPLICATION FILED OCT. 14, 1903.
NO MODEL. 3 SHEETS—SHEET 2.
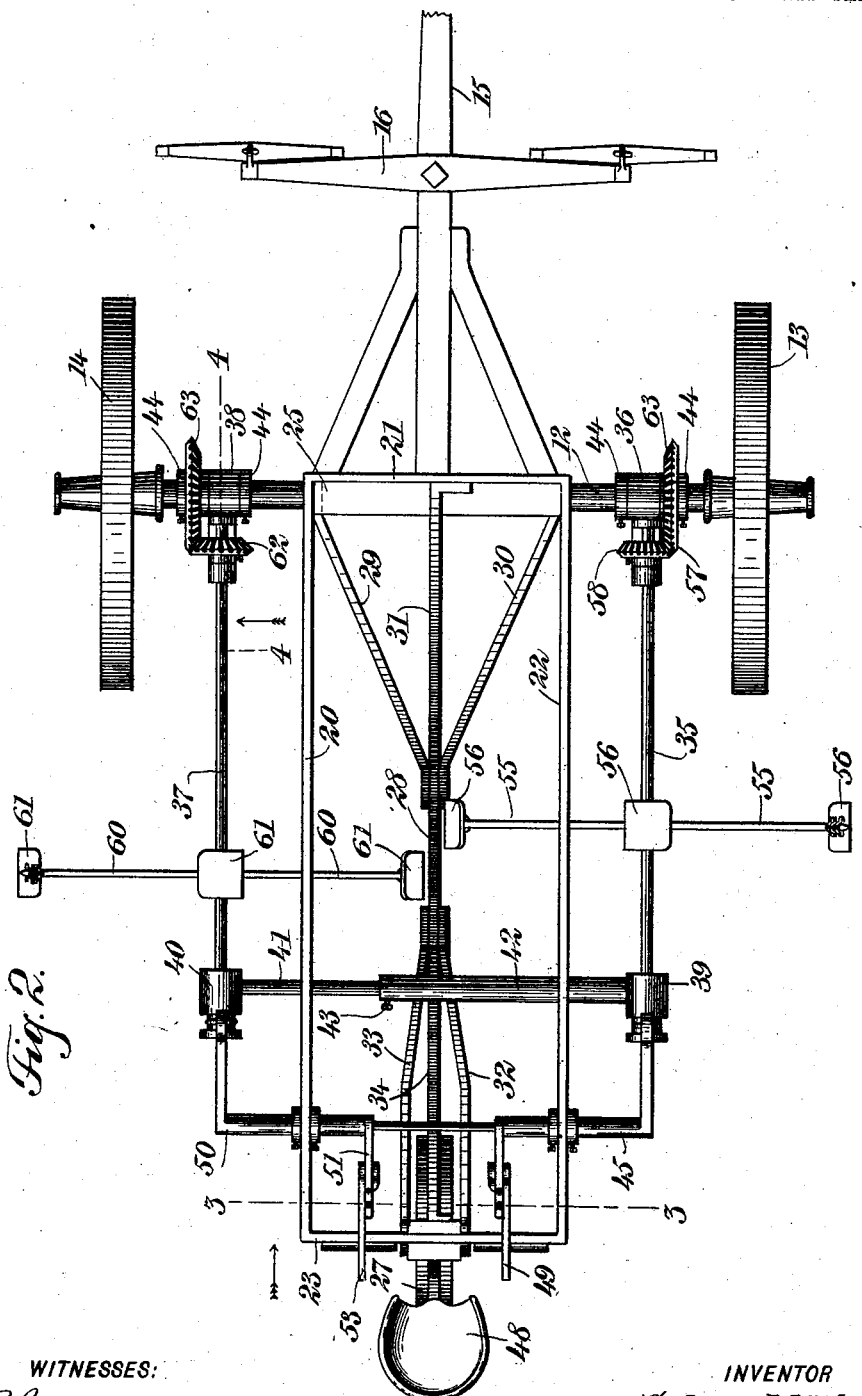
WITNESSES:
INVENTOR
Calvin H. Walters
BY
ATTORNEYS

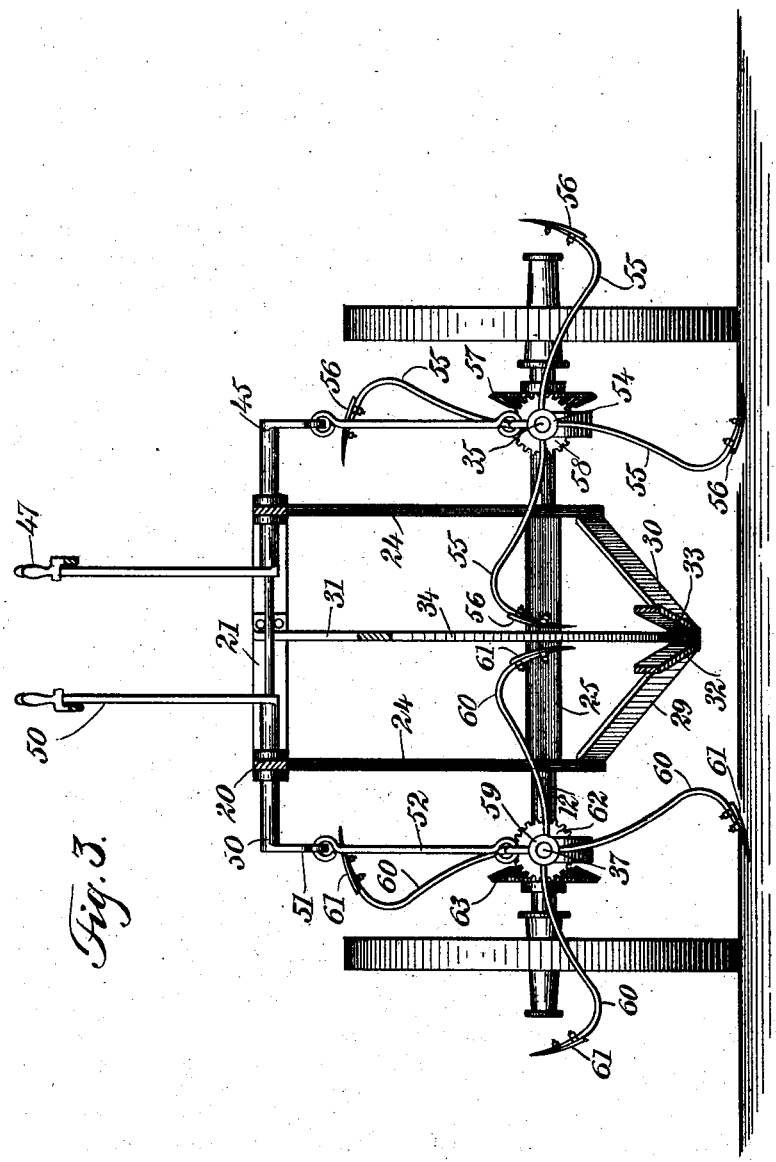

No. 755,337. Patented March 22, 1904.

UNITED STATES PATENT OFFICE.

CALVIN HENRY WALTERS, OF SPRINGFIELD, MISSOURI.

COTTON-CHOPPER.

SPECIFICATION forming part of Letters Patent No. 755,337, dated March 22, 1904.

Application filed October 14, 1903. Serial No. 176,980. (No model.)

*To all whom it may concern:*

Be it known that I, CALVIN HENRY WALTERS, a citizen of the United States, and a resident of Springfield, in the county of Greene and State of Missouri, have invented new and useful Improvements in Cotton-Choppers, of which the following is a full, clear, and exact description.

This invention relates to a form of agricultural implement or machine that is used for the purpose of the removal of small plants growing in rows, such as cotton.

The object of my invention is to provide an improved machine that can be driven along a field having rows of cotton-plants or the like and which will have one or more rotary choppers that are rotated from the wheels of the machine and which will effectually sever the plants along the row or rows at or below the surface of the ground either at regular intervals in the rows, leaving the desired number of plants standing, or remove the plants entirely along the row or rows.

A further object of my invention is to provide in such a device means whereby the rotary choppers may be adjusted both vertically and horizontally.

My invention comprises the novel features of construction and arrangement, as hereinafter set forth and then pointed out in the claims.

Reference is to be had to the accompanying drawings, forming a part of this specification, in which similar characters of reference indicate corresponding parts in all the figures.

Figure 1 is a side elevation of a machine embodying my invention. Fig. 2 is a plan view of the same. Fig. 3 is a sectional view taken on the line 3 3 in Fig. 2 looking in the direction of the arrow, and Fig. 4 is a sectional view on the line 4 4 in Fig. 2 looking in the direction of the arrow and showing a detail of the driving connections.

Referring now to the accompanying drawings, the main axle 12 has secured at its ends the driving-wheels 13 14, which wheels are fast on the axle and caused to revolve therewith. An ordinary pole 15 with whiffletrees 16 may be provided for drawing the machine by horses, if preferred.

I provide a suitable framework comprising a rectangular frame made up of bars 20, 21, 22, and 23. This frame is supported in a horizontal position by two upright members 24, carrying a sleeve 25, that loosely surrounds the axle 12. The rear portion 23 of the frame has a pair of uprights 26, between the lower ends of which is journaled a single rear wheel 27. The frame and uprights are securely braced, preferably by a single bar 28, having its forward end connected with the lower ends of the uprights 24 by braces 29 and 30 and by a bar 31, which extends from said end upward to the middle portion of the bar 21, where it is bolted. The rear end of the bar 28 has two braces 32 and 33 extending rearward to the lower ends of the uprights 26, and another brace 34 extends from said rear end of the bar 28 upward to the middle of the rear bar 23, at which place it is secured.

On one side of the machine is arranged a shaft 35, having its forward end journaled in a box 36, that loosely surrounds the axle 12, and a similar shaft 37 on the other side of the machine is journaled in a box 38, loose on the axle 12. The rear ends of the shafts 35 and 37 revolve in boxes 39 and 40, respectively, which boxes are adjustably connected by a rod 41, secured to the box 40, which rod slides in a tube 42, secured to the box 39, and a bolt 43 serves to clamp the rod and tube in position. The forward ends of the shafts 35 and 37 are correspondingly adjusted by means of collars 44, that are bolted to the axle 12, as shown in Fig. 2.

The box 39 is adjustably supported vertically by means of a bell-crank 45, pivoted on the side bar 22 and connected with the box by a link 46, the upper end of the bell-crank having a suitable handle 47, by which it is operated by the driver located on the seat 48. A rack-bar 49 is pivoted near the handle 47, the teeth of which engage the rear end of the bar 22, thus serving to retain the bell-crank, and consequently the shaft, in its adjusted position. This means of adjustment is duplicated on the opposite side of the machine, where the crank 50, pivoted on the bar 20, has its arm 51 connected with the box 40 by a link 52, a rack 53 serving to retain this adjusting-bar in its proper position.

The shaft 35 has secured thereto a collar 54, carrying a number of curved substantially radial arms 55, each of which is provided with a detachable shoe or hoe 56, the latter being equidistant from the shaft and pointing tangentially and in the same direction of rotation. A bevel-gear 57 is secured to one of the collars 44 and meshes with a bevel-gear 58, secured to the shaft 35. The shaft 37 has a similar rotary member comprising a collar 59, carrying arms 60, provided with shoes 61 on their free ends. This shaft 37 also has a bevel-gear 62 secured thereto and which meshes with a bevel-gear 63, secured to the other collar 44. From Figs. 2 and 3 it will be evident that when the vehicle is drawn forward the axle 12 will be rotated, and consequently the hoe members will be rotated by means of the bevel-gears in opposite directions. By means of the said crank-arms the hoe members are adjusted so that the path of rotation of the shoes will be slightly below the level of the ground. Therefore when the machine is drawn along with the hoe members located directly above two rows of cotton or other plants the latter will be cut off just below the surface of the ground. To compensate for various widths of rows, the hoe members are adjusted to and from each other by means of the telescoping members 41 and 42 and the adjusting-collars 44, as above set forth.

It will be observed from Fig. 3 that the two hoe members revolve in opposite directions and that their hoe extremities are pointed in opposite directions of rotation. By this arrangement the reaction of one hoe member on its bearing tending to move the machine sidewise is compensated for by the reaction of the other member that will tend to move the machine in the opposite direction, and which thrust is directly received and taken up by the telescoping members 41 and 42.

While but one hoe member is shown on each shaft, it is obvious that any number may be provided. The shoe or hoes 56 and 61 are made detachable, so that they may be removed and sharpened when they become dull through use. The construction of the bearing-boxes 36 and 38 is shown in section in Fig. 4, from which it will be seen that the box 36 has a rearwardly-extending arm 36ª, having a collar-support 36ᵇ, that encircles the shaft 35, thus materially strengthening the bearing.

By varying the proportions of the bevel-gears the chopper may be made to revolve rapidly and cut all of the plants or revolve slowly and only sever the plants at certain regular intervals apart.

Having thus described my invention, I claim as new and desire to secure by Letters Patent—

1. In a device of the character described the combination of an axle having a pair of wheels secured thereto, a frame supported upon said axle, a pair of longitudinally-extending cutter-shafts spaced laterally from each other and rotatably mounted on the device, means at the forward ends of said shafts for connecting them pivotally with said axle to swing radially therefrom in vertical planes, means also at said forward ends of the shafts by which they each receive rotary motion from said axle, a cutter carried by each of said shafts between its ends, a bearing-box at the rear end of each shaft, a pair of bars connecting said bearing-boxes together, the bars being connected at their outer ends to the boxes and telescoping with each other at their inner ends for adjustment to or from each other, a set-screw for holding said telescoping bars in their adjusted relation to each other, and means for manually raising or lowering said boxes to regulate the depth of cut to be taken by said cutters.

2. In a device of the character described, the combination of a framework having a bearing, an axle rotatable in said bearing, a wheel secured to each extremity of said axle, a journal-box loosely mounted on said axle adjacent one wheel, a shaft having one end journaled in said box and extending rearwardly, a second journal-box loosely mounted on said shaft and adjacent the other wheel, a second shaft having one end journaled in said second box and extending rearwardly, a journal-box on the rearward end of each of said shafts, a tube secured to one of said latter boxes, a rod secured to said other latter box and slidable in said tube, a bolt for clamping said rod and tube in adjusting position, a bevel-gear on the forward portion of each of said shafts, a bevel-gear on each end of said axle, which latter gear engages with one of the said bevel-gears respectively, means for adjusting each of said bevel-gears on the axle and the adjacent journal-box along the axle, and a cutting member on each shaft.

3. In a device of the character described, the combination of a frame having a bearing, an axle rotatable in said bearing, a wheel secured to each end of said axle, a bearing-box loose on the end portion of each of said axles, a shaft journaled in each of said latter bearing-boxes and extending rearwardly, a journal-box on the rear end of each of said shafts, a connecting member between said latter bearing-boxes, a bell-crank lever pivotally connected to each of said latter bearing-boxes, a rack-bar connected with each of said bell-cranks, and a cutting member on each of said shafts.

In testimony whereof I have signed my name to this specification in the presence of two subscribing witnesses.

CALVIN HENRY WALTERS.

Witnesses:
R. H. COLLINS,
E. D. HOLT.